(12) United States Patent
Xu et al.

(10) Patent No.: US 12,184,530 B2
(45) Date of Patent: Dec. 31, 2024

(54) METHOD AND DEVICE FOR SELECTING RECOMMENDED NODE IN BEHAVIOR DEVIATION MODEL

(71) Applicant: Tsinghua University, Beijing (CN)

(72) Inventors: Ke Xu, Beijing (CN); Yangfei Guo, Beijing (CN); Xiaoliang Wang, Beijing (CN); Mingxing Liu, Beijing (CN)

(73) Assignee: Tsinghua University, Beijing (CN)

( * ) Notice: Subject to any disclaimer, the term of this patent is extended or adjusted under 35 U.S.C. 154(b) by 454 days.

(21) Appl. No.: 17/543,726

(22) Filed: Dec. 6, 2021

(65) Prior Publication Data

US 2022/0191125 A1  Jun. 16, 2022

(30) Foreign Application Priority Data

Dec. 16, 2020 (CN) .......................... 202011490122.5

(51) Int. Cl.
| | |
|---|---|
| *H04L 45/02* | (2022.01) |
| *H04L 41/12* | (2022.01) |
| *H04L 41/14* | (2022.01) |
| *H04L 45/00* | (2022.01) |
| *G06F 17/18* | (2006.01) |

(52) U.S. Cl.
CPC .............. *H04L 45/02* (2013.01); *H04L 41/12* (2013.01); *H04L 41/145* (2013.01); *H04L 45/22* (2013.01); *H04L 45/34* (2013.01); *G06F 17/18* (2013.01)

(58) Field of Classification Search
CPC ....... H04L 45/02; H04L 41/145; H04L 41/12; H04L 45/22; H04L 45/34; H04L 45/123; H04L 45/124; H04L 45/14; H04L 45/304; H04L 45/70; G06F 17/18
See application file for complete search history.

(56) References Cited

U.S. PATENT DOCUMENTS

| | | | |
|---|---|---|---|
| 2015/0208316 A1* | 7/2015 | Mosko .................... | H04L 45/02 370/238 |
| 2016/0078365 A1* | 3/2016 | Baumard ............ | H04L 63/1425 706/12 |
| 2017/0149619 A1* | 5/2017 | Yuan ....................... | H04L 45/70 |

* cited by examiner

*Primary Examiner* — Kwang B Yao
*Assistant Examiner* — Bradley D Lytle, Jr.
(74) *Attorney, Agent, or Firm* — Hodgson Russ LLP (57) ABSTRACT

A method for selecting a recommended node in a behavior deviation model includes: determining a candidate path starting from a delegation node to a target node based on a preset network topology; determining candidate recommended nodes passing through each candidate path, and acquiring a first behavior deviation corresponding to the target node at each candidate node; reading a second behavior deviation of each candidate recommended node from a central node in the network topology; calculating an average deviation value for the target node based on second behavior deviations and first behavior deviations; determining a candidate path with the smallest average deviation value as a target candidate path; and in response to the average deviation value of the target candidate path being less than or equal to a preset warning value, determining the candidate recommended node on the target candidate path as a recommended node.

17 Claims, 6 Drawing Sheets

| node | address prefix length | behavior deviation | start timestamp | path |
|---|---|---|---|---|
| 44.20.11.13 | - | 0.351 | 1603846666.2415366 | ::45.2.1.31<br>::44.20.1.1<br>::44.20.11.1 |
| 144.21.13.0 | 24 | 0.304 | 1603884321.5241643 | ::45.21.61.1<br>::144.21.12.1 |
| 2001:3efb::8b4:78 | - | 0.223 | 1603432881.2349123 | 2001:47fb::b1c2:b07<br>2001:3efb::8b4:1 |
| 2001:ebf4::1 | 64 | 0.190 | 1603432881.3232481 | 2001:4f8e::a2d4:1<br>2001:ebf4:: |

METHOD AND DEVICE FOR SELECTING RECOMMENDED NODE IN BEHAVIOR DEVIATION MODEL

CROSS-REFERENCE TO RELATED APPLICATION

This application claims priority to Chinese Patent Application No. 202011490122.5, filed on Dec. 16, 2020, the entire disclosure of which is incorporated herein by reference.

TECHNICAL FIELD

The disclosure relates to the field of network information security technologies, and particularly to a method and an apparatus for selecting a recommended node based on a path in a behavior deviation model.

BACKGROUND

Since the emergence of a computer network, its basic architecture has not changed a lot. This benefits from a visionary design of the network designer, so that the network may operate stably for a long time. However, many security problems may not be effectively solved due to the side effect from over-success of the current network.

The network layer of the conventional TCP/IP network provides a "best effort" service. The conventional routing protocol finds out a shortest path or an optimal path through a set of metric indicators based on a distance-vector algorithm (such as a RIP, a BGP) or a link status algorithm (such as an OSPF). The forwarding node in the network receives a data packet, queries a forwarding table and forwards the data packet. However, the routing protocol finds out only one forwarding path, since the forwarding node in the network may only know the address of the next hop to be forwarded and may not know the complete forwarding path. That is, the forwarding path is not controllable. However, an increasingly complex network has a strong demand for control of data forwarding paths, so as to achieve the purpose of seeking advantages and avoiding disadvantages. Therefore, path perception and source routing have attracted great attention from academia and industry.

SUMMARY

According to a first aspect of the disclosure, a method for selecting a recommended node in a behavior deviation model includes: determining a delegation node and a target node in a current communication scenario; determining at least one candidate path with the delegation node as a start node and the target node as an end node based on a preset network topology; determining at least one candidate node passing through each of the candidate paths, and acquiring a first behavior deviation corresponding to the target node at each candidate node; reading a second behavior deviation of each candidate node from a central node in the network topology; calculating an average deviation value for the target node based on second behavior deviations and first behavior deviations of all the candidate nodes in each candidate path; determining a candidate path with the smallest average deviation value as a target candidate path; and in response to the average deviation value of the target candidate path being less than or equal to a preset warning value, determining the candidate node on the target candidate path as a recommended node.

According to a second aspect of the disclosure, an electronic device includes a processor and a memory configured to store computer instructions executable by the processor. The processor is configured to: determine a delegation node and a target node in a current communication scenario; determine at least one candidate path with the delegation node as a start node and the target node as an end node based on a preset network topology; determine at least one candidate node passing through each of the candidate paths, and acquire a first behavior deviation corresponding to the target node at each candidate node; read a second behavior deviation of each candidate node from a central node in the network topology; calculate an average deviation value for the target node based on second behavior deviations and first behavior deviations of all the candidate nodes in each candidate path; determine a candidate path with the smallest average deviation value as a target candidate path; and in response to the average deviation value of the target candidate path being less than or equal to a preset warning value, determine the candidate node on the target candidate path as a recommended node.

According to a third aspect of the disclosure, a non-transitory computer readable storage medium has a computer program stored thereon. When the computer program is executed by a processor, the processor is caused to implement a method for selecting a recommended node in a behavior deviation model. The method includes: determining a delegation node and a target node in a current communication scenario; determining at least one candidate path with the delegation node as a start node and the target node as an end node based on a preset network topology; determining at least one candidate node passing through each of the candidate paths, and acquiring a first behavior deviation corresponding to the target node at each candidate node; reading a second behavior deviation of each candidate node from a central node in the network topology; calculating an average deviation value for the target node based on second behavior deviations and first behavior deviations of all the candidate nodes in each candidate path; determining a candidate path with the smallest average deviation value as a target candidate path; and in response to the average deviation value of the target candidate path being less than or equal to a preset warning value, determining the candidate node on the target candidate path as a recommended node.

The additional aspects and advantages of the disclosure will be set forth in the following specification, and will become obvious from the following description, or may be learned by practice of the disclosure.

BRIEF DESCRIPTION OF THE DRAWINGS

The above and/or additional aspects and advantages of the present disclosure may be obvious and easily understood in descriptions of embodiments in combination with figures.

DETAILED DESCRIPTION

Embodiments of the disclosure are described in detail below, and examples of embodiments are illustrated in the accompanying drawings, in which the same or similar reference numbers represent the same or similar elements or elements with the same or similar functions. The embodiments described below with reference to the drawings are exemplary, are intended to explain the present disclosure and are not to be construed as a limitation of the disclosure.

In order to meet path perception and source routing in the related art, the disclosure provides a method and an apparatus for selecting a recommended node based on a path in a behavior deviation model, which may select the recommended node in a recommended node selection mechanism based on a path in a behavior deviation model. The recommended node is one node formed of a path, and communication from a delegation node to a target node is forwarded by the recommendation node. The mechanism includes how to obtain a communication path reachable to both communication parties, how to select a recommended node, and how to calculate a behavior deviation for the to-be-determined node based on the recommended node.

The source routing enables the user to specify a forwarding path of the data packet sent by the source routing, that is, specifying which intermediate forwarding nodes to be passed. This kind of routing requires that some identifiers are inserted in the data packet as a forwarding basis of the intermediate forwarding nodes. Dynamic source routing (DSR) is a typical on-demand routing protocol that may be applied in a mobile ad hoc network, i.e., routing may be performed only when one node needs to send a data packet. The DSR mainly includes "route discovery" and "route maintenance". The "route discovery" is a protocol that may be initiated in response to a source route determining that the routing of the target node is not found locally when a data packet is sent by the source node. The "routing maintenance" is configured to monitor available conditions of the current routing in transmitting data, and when the network topology changes or the routing fails, switch the current routing to another routing or re-initiate the "route discovery" process and delete an invalid routing. In the existing network where a software defined network (SDN) springs up, a new form of source routing is provided by combining a multiprotocol label switching (MPLS) protocol with a segment routing (SR) protocol, in which the SR divides a path selected by the source node into a segment list and encodes to a header of a data packet, so that the forwarding node in the network may be forwarded based on the segment list. In combination with the MPLS, the segment list in the SR is embodied as an MPLS label stack where the segment is the MPLS label, which may be applied to the existing IPv4 and IPv6 protocols at the same time.

In addition, a behavior deviation model is a heterogeneous form of a credit model. The behavior deviation refers to a deviation degree generated by a node relative to its own normal behaviors, which is a reverse evaluation compared with the credit degree. The behavior deviation model is a model often used between two nodes not interacting with each other where a delegation node S evaluates whether the behaviors of a target node D have deviated or not based on information i provided by a recommended node R and a behavior deviation value $d_R$ of the recommended node R itself, i.e., it is evaluated whether behaviors of the target node are trusted, further to judge whether it is worthy of communicating with the target node D. By means of the model, the delegation node S may effectively judge the behavior deviation of the target node D, further to judge whether to communicate with the target node D. The newly added node in the network needs to evaluate other nodes by means of the recommended node. Therefore, the recommended node plays a very important role in a behavior deviation model, malicious behaviors of the recommended node may lead to serious consequences, and when a correct recommended node cannot be selected by the method for selecting a recommended node, it may seriously affect quality evaluation of the behavior deviation value.

The purpose of the present disclosure is to overcome the problems existing in the related art, select some recommended nodes in a safe and efficient manner, and provide reference information for the delegation node to evaluate the behavior deviation of the to-be-determined node.

The method and the apparatus for selecting a recommended node based on a path in a behavior deviation model in the embodiment of the disclosure are described below with reference to the accompanying drawings.

Figure 1:
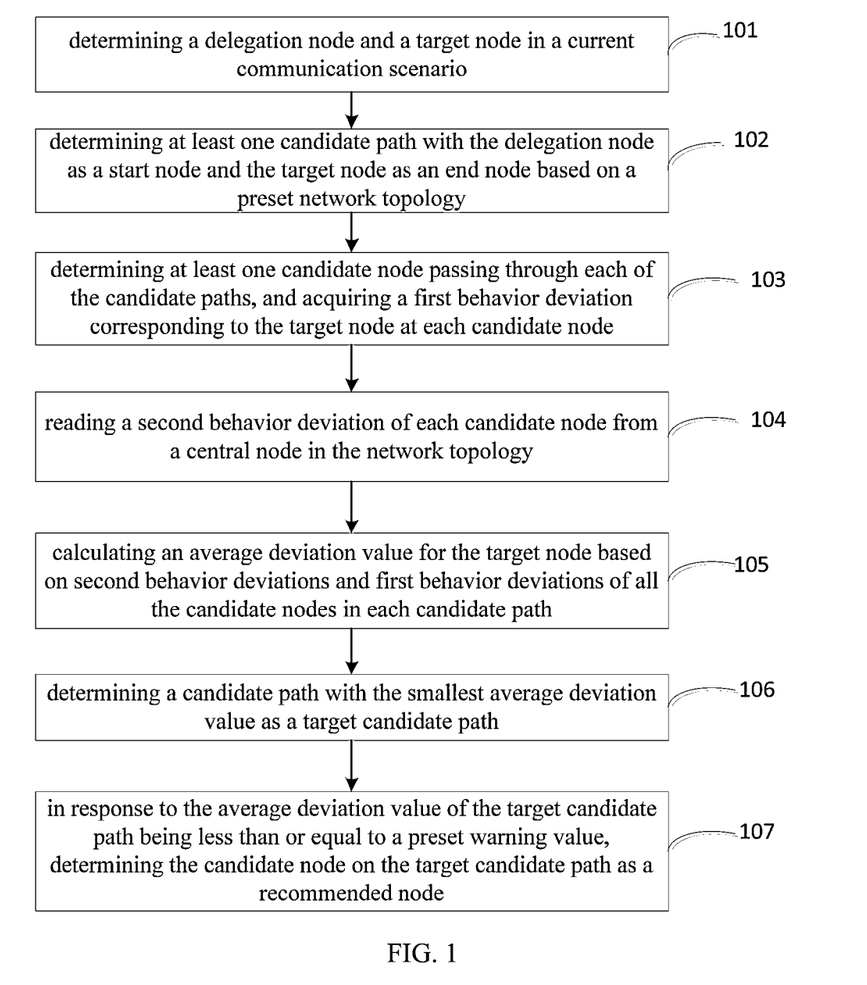
FIG. 1 is a flowchart of a method for selecting a recommended node based on a path in a behavior deviation model according to the embodiment of the disclosure.

FIG. 1 is a flowchart of a method for selecting a recommended node based on a path in a behavior deviation model according to the embodiment of the disclosure.

As illustrated in FIG. 1, the method for selecting a recommended node based on a path in a behavior deviation model includes the following steps.

At block 101, a delegation node and a target node in a current communication scenario are determined.

In the embodiment, a reachable path between two communication parties, i.e., the delegation node and the to-be-determined node (such as a target node), is firstly determined based on a method for selecting and testing. Then, the delegation node selects nodes on the reachable path based on the aggregated path information. The recommended node obtains its own behavior deviation based on surrounding nodes directly interacting with the recommended node, and stores this behavior deviation in a central node. Finally, a behavior deviation of the delegation node relative to the to-be-determined node is calculated based on the evaluation information of the recommended node relative to the to-be-determined node and its own behavior deviation of the recommended node.

Figure 2:
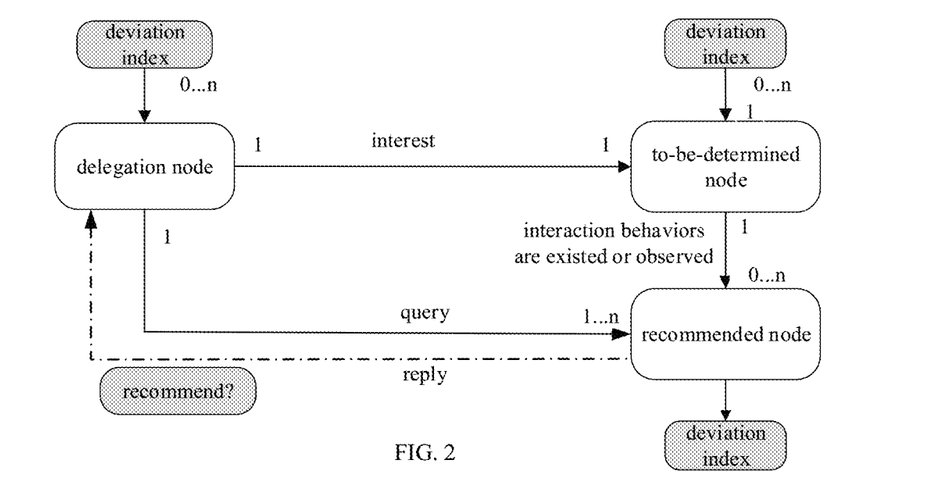
FIG. 2 is a structural diagram of a behavior deviation model according to an embodiment of the disclosure.

As illustrated in FIG. 2, when the delegation node communicates with the to-be-determined node (when the to-be-determined node is a trustable communication node, the to-be-determined node may be a target node in the embodiment of the disclosure), the recommended node is selected based on a deviation index sent by the recommended node which may also be understood as a behavior deviation. When the recommended node performs evaluation on a behavior deviation of the to-be-determined node, the behavior deviation may be obtained based on the existed or observed historical interaction behaviors of the to-be-determined node. The obtaining method may be based on deep learning, etc.

The delegation node and the target node may be understood as nodes of two communication parties.

At block 102, at least one candidate path with the delegation node as a start node and the target node as an end node is determined based on a preset network topology.

The preset network topology is determined based on a hierarchical structure of the network, which specifies connection situations between various routers, at least one candidate path with the delegation node as a start node and the target node as an end node may be determined based on the connection situations in the preset network topology.

In an embodiment of the disclosure, before determining at least one candidate path with the delegation node as a start node and the target node as an end node based on a preset network topology, the method further includes: querying whether a behavior deviation corresponding to the target node is locally stored at the delegation node; in response to the behavior deviation being locally stored at the delegation node, acquiring recording time of the behavior deviation; and entering a recommended node selection mode in response to determining that time difference between the current time and the recording time is greater than a preset time threshold. In other words, the time when the behavior deviation corresponding to the target node is locally stored at the delegation node is relatively old, it is deemed to be expired; or when the behavior deviation corresponding to the target node is not locally stored at the delegation node, the recommended node selection mode is directly entered.

At block 103, at least one candidate recommended node passing through each of the candidate paths is determined, and a first behavior deviation corresponding to the target node is acquired at each candidate recommended node.

In the embodiment, at least one candidate recommended node passing through each of the candidate paths is determined, and a first behavior deviation of each candidate recommended node relative to the target node is acquired.

In an embodiment of the disclosure, before determining the first behavior deviation of each candidate recommended node relative to the target node, the method includes: locally storing the first behavior deviation corresponding to the target node in each candidate recommended node; and determining the first behavior deviation corresponding to the target node at each candidate node includes: reading the first behavior deviation corresponding to the target node locally stored at each candidate node.

At block 104, a second behavior deviation of each candidate recommended node is read from a central node in the network topology.

The second behavior deviation of each candidate recommended node is stored at the central node.

In an embodiment of the disclosure, a third behavior deviation of each candidate recommended node and a fourth behavior deviation of a neighbor node adjacent to each candidate recommended node are acquired, the second behavior deviation of each candidate recommended node is acquired by calculating the third behavior deviation and the fourth behavior deviation based on a preset formula and the second behavior deviation is stored in a deviation table of the central node.

It may be understood that, initialization of the behavior deviation in the embodiment of the disclosure may be selectively configured. A node may or may not set its own deviation value (i.e., a first behavior deviation) relative to other nodes when the network starts. In response to receiving a recommendation request, the recommended node may query the maintained behavior deviation table. In response to a behavior deviation corresponding to the to-be-determined node being stored at the recommended node, the recommended node returns it to the delegation node and forwards the request to its neighbor node. A global behavior deviation of the recommended node is stored at the central node, which is an arithmetic average sum of behavior deviations of all neighbor nodes of the recommended node.

In the embodiment of the disclosure, a preset formula is shown in the formula (1):

$$d_{g-node} = \sum_{i}^{neighbour} \frac{d_{i \to node}}{neighbour} \quad \text{formula (1)}$$

where $d_{g-node}$ is a second behavior deviation of a candidate recommended node $^{node}$, $d_{i \to node}$ is a fourth behavior deviation of a neighbor node relative to the candidate recommended node $^{node}$, neighbour represents a number of all neighbor nodes of the candidate recommended node $^{node}$, which is an integer.

The neighbor node may be understood as a node directly connected to the recommended node. In addition, the behavior deviation may be obtained by the relevant node performing tests based on interaction behaviors with other nodes and information (such as a network state, pre-estimated arrival time and actual arrival time of the message) when interaction behaviors occur for each time.

Figure 3:
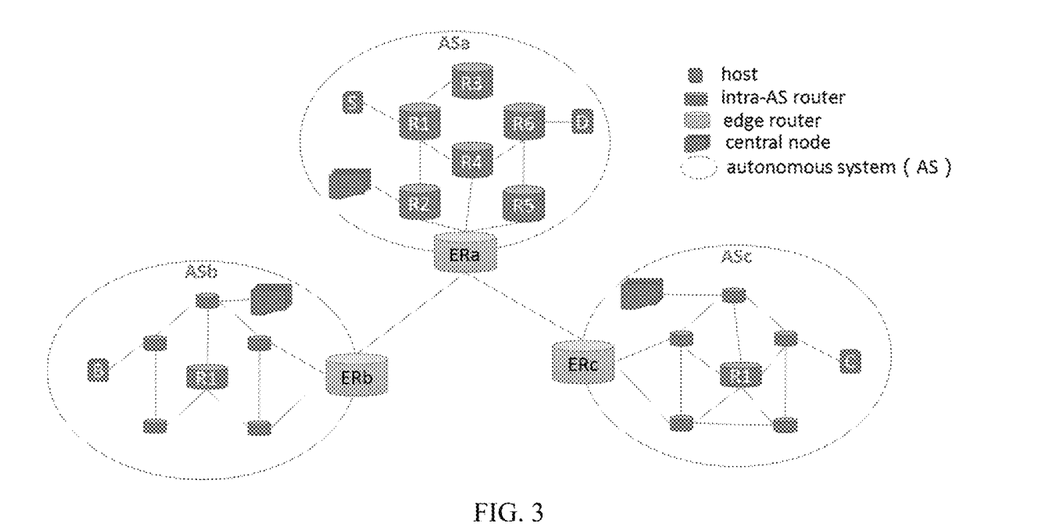
FIG. 3 is a structural diagram of a network topology according to an embodiment of the disclosure.

In an embodiment of the disclosure, as illustrated in FIG. 3, the network is divided into an intra-autonomous system (hereinafter referred to as intra-AS) and an inter-autonomous system (hereinafter referred to as inter-AS) based on the existing hierarchical structure. In each intra-AS, a real address integrated identification management solution is configured for a central node and communication nodes. The central node is configured by a network administrator in the intra-AS, for storing a global deviation value of each communication node in the AS, in which the communication node includes a delegation node, a target node, a recommended node, etc., and the global deviation value may be understood as the above second behavior deviation. The inter-AS requires a logical central node for storing a global deviation value of each intra-AS. Here, the logical central node may be a distributed implementation physically.

At block 105, for all the candidate recommended nodes in each candidate path, an average deviation value is calculated based on second behavior deviations and first behavior deviations.

In the embodiment, an average deviation value is calculated based on second behavior deviations and first behavior deviations for all the candidate recommended nodes in each candidate path.

It may be understood that, before the preset timeout arrives, first behavior deviations and second behavior deviations for all the candidate recommended nodes in the candidate path are received by the delegation node, in which the first and second behavior deviations are sent back by the recommended node, and an average deviation value for the to-be-determined node is calculated with a weighted averaging algorithm based on the received first and second behavior deviations. The calculation formula is shown in the formula (2):

$$d_d = \sum_{i}^{recommender} d_{r_i \to d} * \frac{d_{g \to r_i}}{\sum_{j}^{recommender} d_{g \to r_j}} \qquad \text{formula (2)}$$

where $d_d$ is an average deviation value for the to-be-determined node, $d_{r_i \to d}$ is a first behavior deviation of the recommended node $r_i$ relative to the to-be-determined node, $d_{g \to r_i}$ is a second behavior deviation of the recommended node $r_{i,recommender}$ is a number of received recommended nodes, and $$\frac{d_{g \to r_i}}{\sum_{j}^{recommender} d_{g \to r_j}}$$

represents a weight of the current recommended node in the selected recommended nodes.

At block 106, the candidate path with the smallest average deviation value is determined as a target candidate path. It is judged whether the average deviation value of the target candidate path is greater than a preset warning value.

In the embodiment, the candidate path with the smallest average deviation value is determined as a target candidate path, and it is judged whether the average deviation value of the target candidate path is greater than a preset warning value.

In an embodiment of the disclosure, in response to the average deviation value being greater than the preset warning value, it is judged whether the average deviation value is greater than or equal to a preset maximum value, in which the preset maximum value is greater than the warning value. In response to the average deviation value being greater than the preset maximum value, a notification message indicating a forbidden communication connection between the delegation node and the target node is fed back to the delegation node. In response to the average deviation value being less than or equal to the preset maximum value, a difference value between the average deviation value and the warning value is calculated, a reduced packet distribution rate corresponding to the difference value is determined, and a preset packet distribution rate from the delegation node to the communication node is adjusted based on the reduced packet distribution rate.

At block 107, in response to the average deviation value being less than or equal to the preset warning value, the candidate recommended node in the target candidate path is determined as a recommended node.

In an embodiment of the disclosure, in response to the average deviation value being less than or equal to the preset warning value, the candidate recommended node in the target candidate path is determined as a recommended node, so that communication between the delegation node and the target node is achieved through the recommended node in the target candidate path.

Figure 4:
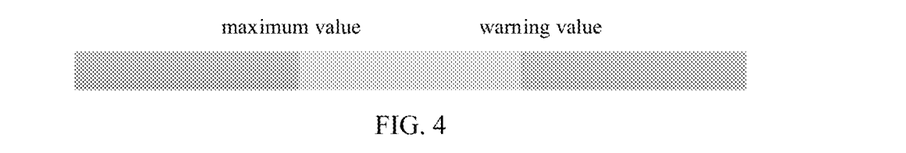
FIG. 4 is a diagram of a two-segment threshold according to an embodiment of the disclosure.

It may be understood that, two thresholds (a warning value and a preset maximum value) are set as illustrated in FIG. 4. When the behavior deviation for the to-be-determined node exceeds a warning value, the delegation node may still communicate with the to-be-determined node, but needs to take some restrictive measures. When the behavior deviation for the to-be-determined node exceeds the maximum value, the delegation node may immediately recalculate the deviation for the to-be-determined node or take actions to prohibit the communication. Each node may independently set its respective two thresholds. Each node sets the warning value and the maximum value of the behavior deviation according to its own situation. When the behavior deviation for the to-be-determined node calculated by the delegation node reaches the warning value, some restrictive measures need to be taken by the delegation node, for example, reducing a packet distribution rate. When the behavior deviation reaches the maximum value, it is necessary to reconsider whether to continue the communication or recalculate the behavior deviation. In this way, the network is more flexible to a certain extent, and the nodes have greater autonomy.

In an embodiment of the disclosure, the behavior deviation is initialized and calculated. The recommended node sets a behavior deviation of the node without interaction with the recommended node to an initial value, or does not set the initial value. The central node sets a behavior deviation of the node without interaction to a warning value. The delegation node sends a recommendation request to acquire a recommended node and a deviation value of the recommended node relative to the to-be-determined node. Further, the delegation node acquires a deviation value of the recommended node itself from the central node, and obtains a deviation value for the to-be-determined node based on a behavior deviation calculation algorithm.

Since the behavior deviation is updated in real time, recalculating the behavior deviation is used as a compensation strategy. In other words, the first behavior deviation of each candidate recommended node relative to the target node is updated in real time, respective maintained behavior deviation tables are periodically exchanged between neighbor nodes. The node also needs to update in real time a behavior deviation value of a communication peer in the communication process. However, this process is performed locally at the respective node without intervention of the recommended node.

Updating the behavior deviation is a process that respective maintained behavior deviation tables are periodically exchanged among the nodes. For example, the central node only periodically exchanges a part of behavior deviations of each inter-AS in the behavior deviation table. In the communication process, the delegation node and the to-be-determined node also update the behavior deviation of the peer in their respective behavior deviation tables, without involving in the used recommended node. The formula for each update is shown as below in the formula (3):

$$d_{curr} = \alpha * d_{prev} + s \qquad \text{formula (3)}$$

where $d_{curr}$ is an update result of a behavior deviation of a peer after this interaction, $\alpha$ is an attenuation coefficient representing reduced dependency on the historical interaction behaviors, $d_{prev}$ is a first behavior deviation for the peer (such as a to-be-determined node) before this interaction, and s is a profit generated by this interaction (the profit may be positive or negative).

Figure 5:
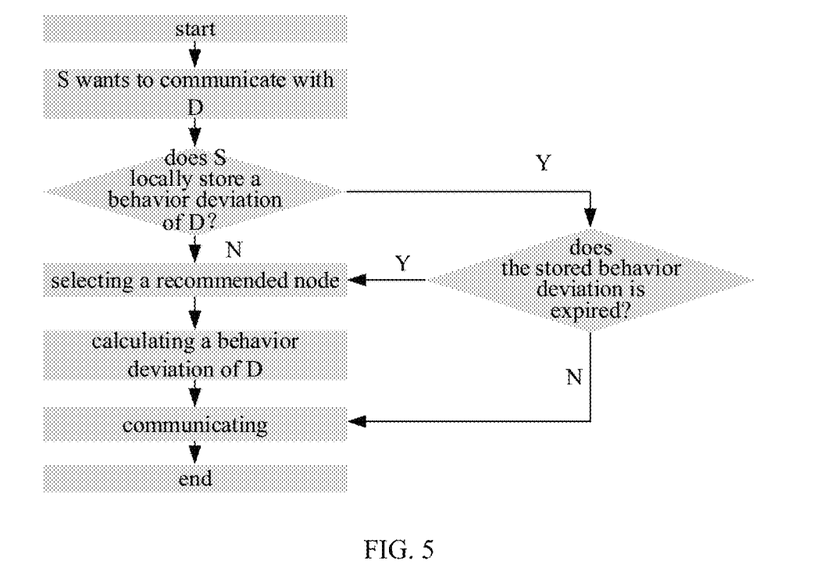
FIG. 5 is a flowchart of communication between a delegation node and a to-be-determined node according to an embodiment of the disclosure.

A communication process and a recommended node selection process are described in an embodiment of the disclosure. FIG. 5 illustrates a communication process between a delegation node S and a to-be-determined node D based on a behavior deviation model in the disclosure. Before the delegation node S communicates with the to-be-determined node D, it is firstly queried whether the delegation node locally stores the behavior deviation of the to-be-determined node; if so, it is judged whether the stored behavior deviation is expired and needs to be updated; if the stored behavior deviation does not need to be updated, the delegation node S directly communicates with the to-be-determined node D; if the time limit is exceeded or if the behavior deviation for the to-be-determined node is not stored locally at the delegation node, a recommended node selection process needs to be started, then communication is performed via a path selected based on the result from the recommended node. Only when no behavior deviation for the to-be-determined node is stored in the local behavior deviation table of the delegation node or the behavior deviation for the to-be-determined node is expired and invalid, selection of the recommended nodes and calculation of the behavior deviation may be performed. Otherwise, communication is performed directly based on the local deviation. And each interaction behavior in the communication process only updates a locally stored behavior deviation of a node.

The behavior deviation model in the embodiment of the disclosure continues to refer to FIG. 2. The node simultaneously plays three roles in a network, i.e., a node for initiating communication is served as a delegated node, a node for receiving recommended requests of other nodes is served as a recommended node, and a node waiting for communication is served as a to-be-determined node. The node acquires a communication index from historical communication, and forms its own behavior deviation relative to other nodes for evaluating the behavior and credibility of other nodes.

Figure 6:
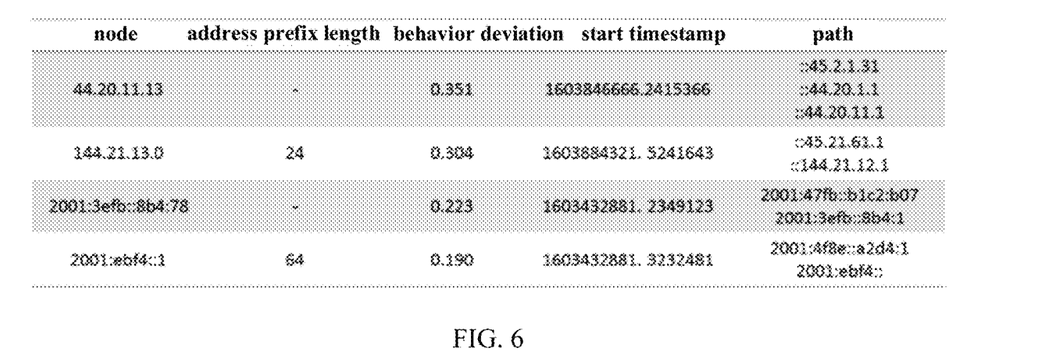
FIG. 6 is a behavior deviation value table according to an embodiment of the disclosure.

An example topology of a hierarchical network in the disclosure is illustrated in FIG. 3. The node in the network needs to maintain behavior deviation values when communicating with other nodes in a behavior deviation table, and may (or may not) set a behavior deviation value of another node without interacting with the node to a warning value. For nodes in the same AS, a point-to-point maintenance mechanism is adopted, which is embodied as an address prefix of the node being empty in the behavior deviation table. For nodes across the AS, a maintenance mode based on address prefixes is adopted, which is embodied as the address prefix length of the node being not empty in the behavior deviation table. When there are too many nodes in the AS and deviation values for most of nodes belonging to the same address prefix are less than a warning value, a routing aggregation mode may be adopted. That is, the maintenance mechanism is converted to a maintenance mode of the address prefix, and the maximum value among deviation values for the aggregated nodes is determined as the aggregated deviation value. FIG. 6 illustrates an example of a behavior deviation table. The behavior deviations of the $1^{st}$ and $3^{rd}$ rows in the table are based on the point-to-point maintenance, and behavior deviations of the $2^{nd}$ and $4^{th}$ rows in the table are based on the point-to-domain maintenance. The method for storing the deviations at the center node is similar to a local storage method. When the central node in the AS maintains behavior deviations, the central node may not perform routing aggregation on nodes of the same AS but the central node must perform routing aggregation on nodes of another AS.

Figure 7:
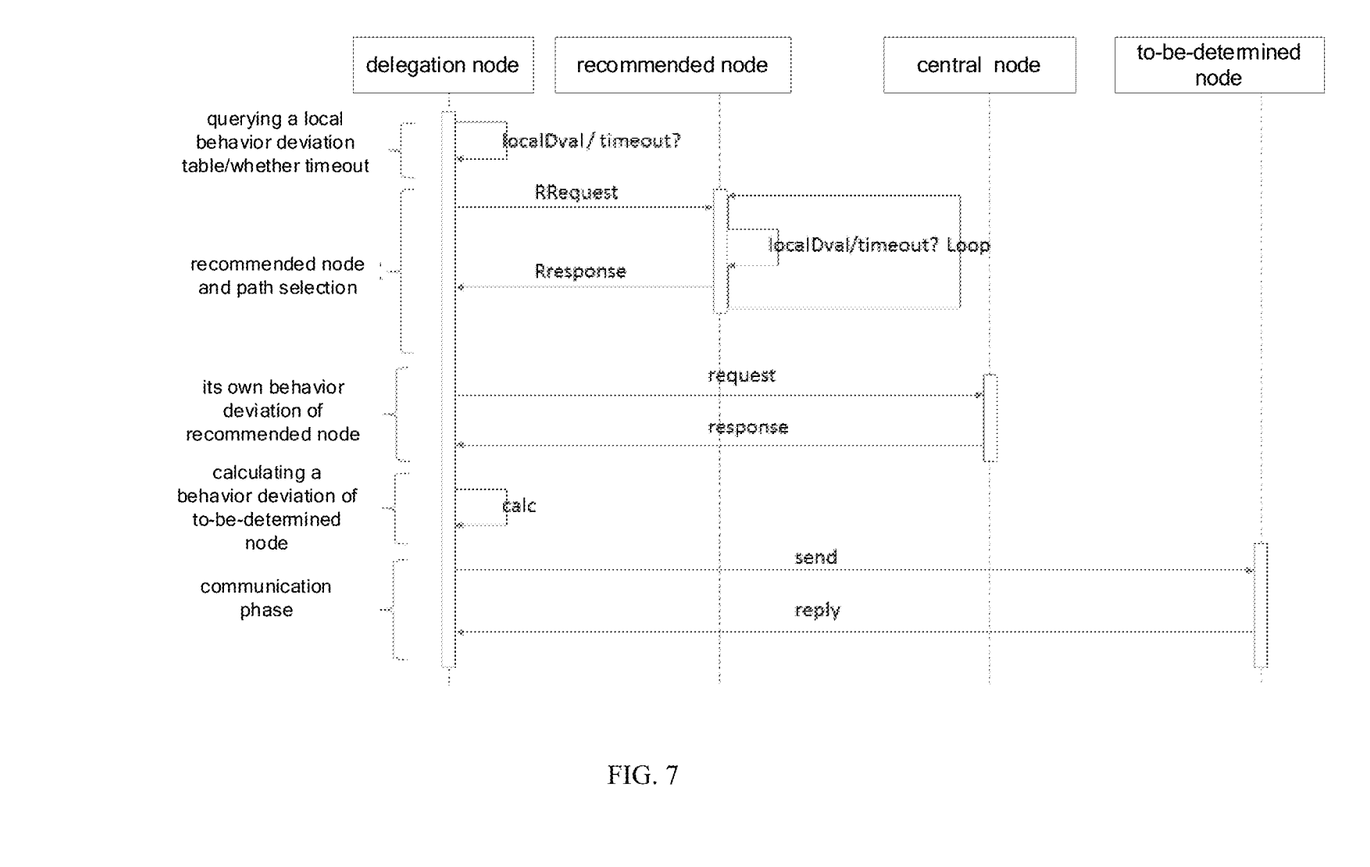
FIG. 7 is a sequence diagram of communication based on a recommended node according to an embodiment of the disclosure.

FIG. 7 illustrates a sequence process of recommended node selection in the disclosure. When a reachable path is acquired, a method for selecting and testing is adopted as an improvement to a "flooding-feedback-hopping" method. The "hops" as a constraint condition are configured to constrain a distance for which "selective flooding" may be performed at most. In the network, the delegation node needs to communicate with the to-be-determined node, but the delegation node does not know a behavior deviation value for the to-be-determined node in advance and may not thus judge its credibility, and the delegation node does not know the security of a network path either. In this case, the delegation node needs to select some recommended nodes and paths. The specific steps are as follows:

(a) each node in the network sets its own signature information, and saves abstract information of signatures of its trusted nodes and next hop nodes of the trusted nodes.

(b) several nodes are randomly selected from neighbor nodes trusted by the delegation node and are served as the next hop nodes of the delegation node, in which behavior deviations of the trusted neighbors must be less than or equal to the warning value.

Figure 8:
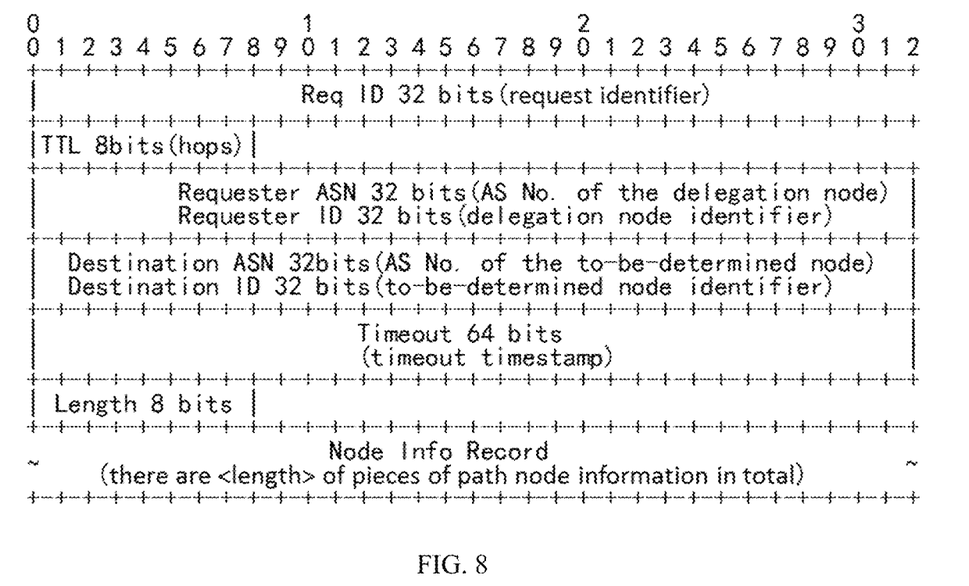
FIG. 8 is a packet format of a recommendation request according to an embodiment of the disclosure.

(c) the delegation node sends a recommendation request to the selected node, and the packet format of the request is as illustrated in FIG. 8.

Figure 9:
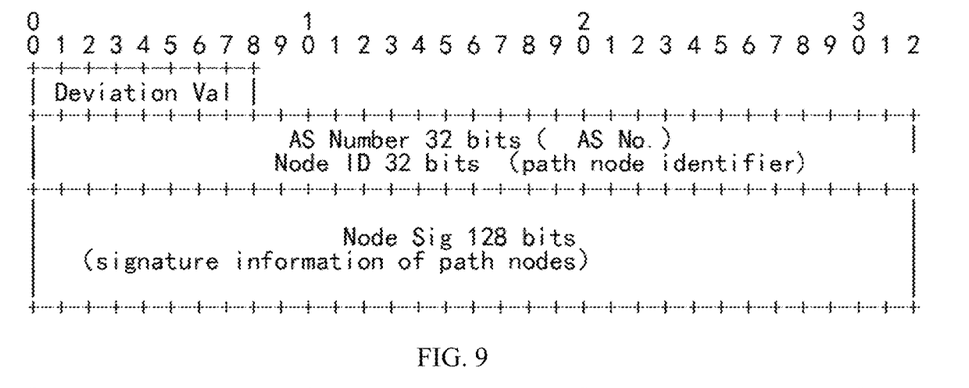
FIG. 9 is a packet format of path node information according to an embodiment of the disclosure.
Figure 10:
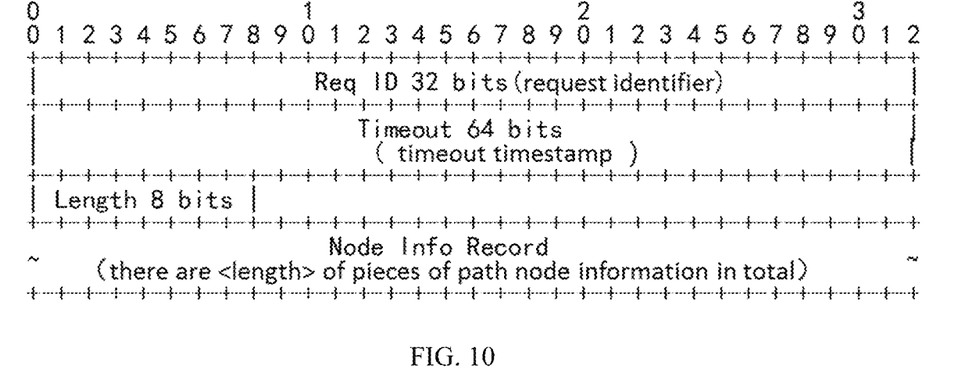
FIG. 10 is a packet format fed back by a recommended node according to an embodiment of the disclosure.

(d) the node on the forwarding path that receives the recommendation request is served as a candidate recommended node, the candidate recommended node firstly checks whether the locally cached request ID is present or not: if present, the request ID is discarded and if not present, the timeout of the request packet is checked. Then, if the timeout is exceeded, the request ID is discarded and if the timeout is not exceeded, the local behavior deviation table is checked. Next, if there is a behavior deviation (i.e., the first behavior deviation) for the to-be-determined node in the local behavior deviation table, the candidate recommended node transmits its own information and the behavior deviation for the to-be-determined node to the delegation node, in which data format corresponding to the information and the behavior deviation for the to-be-determined node is shown in FIG. 9. Finally, the information and the behavior deviation for the to-be-determined node are written into a request packet, and the recommendation request is sent to its neighbor nodes, in which data format of the request packet fed back by the recommended node may refer to FIG. 10.

(e) when the recommendation request has timed out, the delegation node may construct a complete reachability network by using a directed acyclic graph (DAG) based on the feedback of the recommended node and calculate behavior deviations for the to-be-determined node on respective reachable paths.

The disclosure is illustrated in combination with accompanying drawings through specific examples, which do not constitute a limitation of the disclosure.

In the embodiment, a host S and a host D are located in the same AS ASa, in which S as a delegation node wants to communicate with the to-be-determined node D. The host S is considered as a delegation node, and the host D is considered as a target node or a to-be-determined node.

The identifier of the node in the embodiment is represented by a symbol, for example, the complete identifier of the node S is ASa:S. In the embodiment, warning values of the node S and the node D are set to 0.3, maximum values of the node S and the node D are set to 0.4, and expiration time of the request is set to 30 s. After the initialization process, in the AS ASa, behavior deviations (i.e., first behavior deviations) of routers R1, R2, R3, R4, R5, R6 and ERa relative to the node D are initialized to 0.1, 0.2, 0.3, 0.3, 0.3, 0.3, 0.2 respectively, behavior deviations of these routers relative to the node S are initialized to 0.3, 0.2, 0.3, 0.1, 0.1, 0.2, 0.3 respectively, and global behavior deviations (i.e., second behavior deviations) of routers R1, R2, R3, R4, R5, R6, ERa stored at the central node are 0.14, 0.23, 0.27, 0.16, 0.15, 0.25, 0.05.

The delegation node S checks its local behavior deviation table before sending data, and if the table is empty, a process of selecting the recommended node is performed. The delegation node sends a data packet for a recommendation request, in which the request ID is incremented and set to 1, time to live (TTL) is set to 64, an identifier of the requester (i.e., the node S) is ASa:S, the identifier of the target node is ASa:D, and a timeout is 30 s by adding the current time to the maximum waiting time, a length is 0, and path node information is empty (indicating that there is no recommended node at this time). The node S sends the data packet for the recommendation request to a neighbor node (i.e., a router ASa:R1).

When the recommendation request is received, ASa:R1 firstly checks a request ID of the packet. If the request ID is already present in a cache table, the packet is discarded; and if the packet is not present, the timeout of the packet is checked. If the timeout is greater than the current time, the packet is discarded; and if the timeout is not greater than the current time, TTL of the packet is checked. If the TTL of the packet is reduced to 0, the packet is discarded; and if the TTL is not reduced to 0, a local behavior deviation table is checked. If a behavior deviation for the to-be-determined node D is present, its node identification information and signature information, and the behavior deviation for the to-be-determined node D are packaged into a packet and sent to the delegation node S. Then, the node identification information and signature information of the node are added to a request packet, and forwarded to ASa:R2, ASa:R3, ASa:R4, for selection of a new recommended node.

After the time is expired, the node S summarizes a response of the received data packet of each recommendation request. In the embodiment, the node S receives a response from each recommended node, and four paths may be generated through the DAG:

S→R1→R4→R6→D,
S→R1→R4→ERa→R5→R6→D,
S→R1→R2→ERa→R4→R6→D, and
S→R1→R2→ERa→R5→R6→D.

Analyzing the 4 paths, it may be found that the $2^{nd}$ and $3^{rd}$ paths are included in the $1^{st}$ path, so it is only necessary to compare behavior deviations (that is, 0.196, 0.205) for the node D that are calculated by the recommended nodes on the $1^{st}$ path and the $4^{th}$ path. Therefore, it is more secure and credible to select the $1^{st}$ path with the small behavior deviation 0.196. That is, the first path may be selected to complete communication from S to D through the MPLS or other source routing technologies.

In an embodiment of the disclosure, since the network layer is directly used for data transmission in the above embodiments, the existing network routing forwarding protocol changes slightly, and the solution has small overhead.

In summary, with the method for selecting a recommended node in a behavior deviation model in the embodiments of the disclosure, a heterogeneous model (i.e., a behavior deviation model) of a credit model is employed to verify from a reverse side whether a network node meets a behavior expectation, and further judge the feasibility of the network node; a recommended node is selected through a path, and a behavior deviation for a to-be-determined node is further calculated based on the recommended node, so that the recommended node on the path is reachable, and more accurate and credible. Furthermore, the behavior deviations of the nodes are divided into a local behavior deviation and a global behavior deviation, and the behavior deviation of the node calculated by weighted averaging is more objective and credible. With the above method, it is achieved that the forwarding path passing through the recommended nodes is controllable, thereby seeking advantages and avoiding disadvantages.

Figure 11:
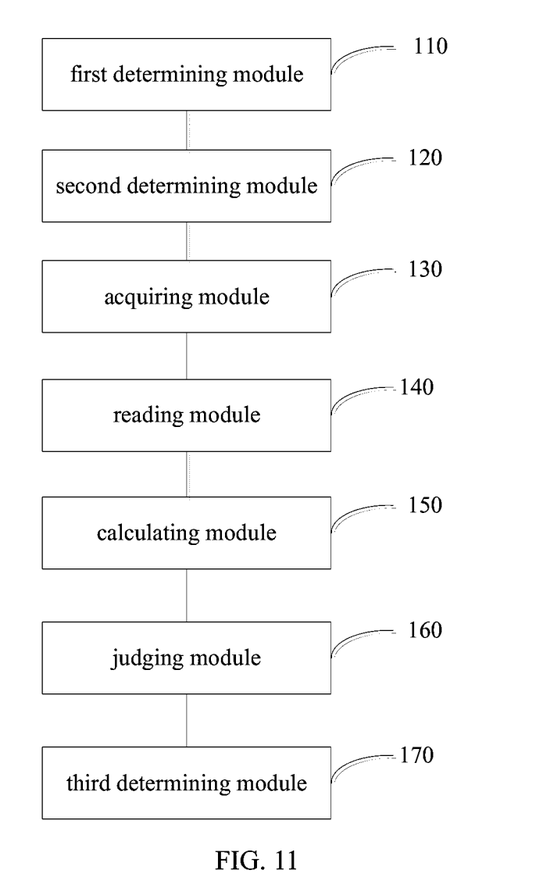
FIG. 11 is a structural diagram of an apparatus for selecting a recommended node based on a path in a behavior deviation model according to an embodiment of the disclosure.

In order to clarify the above embodiment, the embodiment provides an apparatus for selecting a recommended node in a behavior deviation model. FIG. 11 is a structural diagram of an apparatus for selecting a recommended node based on a path in a behavior deviation model according to an embodiment of the disclosure.

As illustrated in FIG. 11, the apparatus includes a first determining module 110, a second determining module 120, an acquiring module 130, a reading module 140, a calculating module 150, a judging module 160 and a third determining module 170.

The first determining module 110 is configured to determine a delegation node and a target node in a current communication scenario; the second determining module 120 is configured to determine at least one candidate path with the delegation node as a start node and the target node as an end node based on a preset network topology; the acquiring module 130 is configured to determine at least one candidate recommended node passing through each of the candidate paths, and acquire a first behavior deviation corresponding to the target node at each candidate node; the reading module 140 is configured to read a second behavior deviation of each candidate recommended node from a central node in the network topology; the calculating module 150 is configured to calculate an average deviation value for the target node based on second behavior deviations and first behavior deviations of all the candidate recommended nodes in each candidate path; the judging module 160 is configured to determine a candidate path with the smallest average deviation value as a target candidate path, and judge whether the average deviation value of the target candidate path is greater than a preset warning value; and the third determining module 170 is configured to, in response to the average deviation value being less than or equal to the preset warning value, determine the candidate recommended node in the target candidate path as a recommended node, to achieve communication between the delegation node and the target node through the recommended node in the target candidate path.

It needs to be noted that, the description of the embodiment of a method for selecting a recommended node based on a path in a behavior deviation model is also applied to an apparatus for selecting a recommended node based on a path in a behavior deviation model in the embodiment, which will not be repeated here.

In order to achieve the above embodiments, the disclosure further provides a computer device. The computer device includes a memory, a processor and a computer program stored on the memory and run on the processor. The processor implements the method as described in the above embodiments when executing the computer program. To achieve the above embodiments, the disclosure further provides a non-transitory computer readable storage medium. The instructions in the storage medium are executed by a processor so as to execute the method as described in the above embodiments.

To achieve the above embodiments, the disclosure further provides a computer program product. The instructions in the computer program product are executed by a processor so as to execute the method as described in the above embodiments.

In the disclosure, descriptions with reference to terms "an embodiment", "some embodiments", "example", "specific example" or "some examples" mean specific features, structures, materials or characteristics described in combination with the embodiment or example are included in at least an embodiment or example of the disclosure. The schematic representations of the above terms do not have to be the same embodiment or example. Moreover, specific features, structures, materials or characteristics described may be combined in one or more embodiments or examples in a suitable manner. Furthermore, embodiments or examples described in the specification, as well as features of embodiments or examples, may be combined without conflicting with each other.

In addition, the terms "first" and "second" are only for describing purposes and are not to be construed as indicating or implying relative importance or implicitly indicating the number of technical features indicated. Thus, features limiting "first" and "second" may explicitly or implicitly include at least one of the features. In the description of the disclosure, the wording "a plurality of" means at least two, for example, two, three, unless otherwise expressly and specifically stated.

Any process or method described in the flowchart or otherwise described herein may be understood as representing one or more modules, segments, or portions of codes of executable instructions for implementing the blocks of a customized logical function or process, and the scope of the embodiments of the present disclosure includes additional implementations, in which the functions may be executed not in the sequence shown or discussed, including in a substantially simultaneous manner or in a reverse sequence, which will be appreciated by those skilled in the art the embodiments of the disclosure belong to.

The logics and/or blocks represented in the flowchart or described in other ways herein, for example, may be considered as an ordered list of executable instructions configured to implement logic functions, which may be specifically implemented in any computer readable medium for use by a system, an apparatus or a device for executing instructions (such as a computer-based system, a system including a processor, or other systems that may obtain and execute instructions from a system, an apparatus or a device for executing instructions) or in combination with the system, the apparatus or the device for executing instructions. A "computer readable medium" in the disclosure may be an apparatus that may contain, store, communicate, propagate or transmit a program for use by a system, an apparatus or a device for executing instructions or in combination with the system, the apparatus or the device for executing instructions. A more specific example (a non-exhaustive list) of a computer readable medium includes the followings: an electronic connector (an electronic apparatus) with one or more cables, a portable computer disk box (a magnetic device), a random access memory (RAM), a read-only memory (ROM), an electrically programmable read-only memory (an EPROM or a flash memory), an optical fiber apparatus, and a portable optical disk read-only memory (CDROM). In addition, a computer readable medium even may be paper or other suitable medium on which a program may be printed, since paper or other medium may be optically scanned, and then edited, interpreted or processed in other suitable ways if necessary to obtain a program electronically and store it in a computer memory.

It should be understood that all parts of the present disclosure may be implemented with hardware, software, firmware and their combination. In the above embodiment, a plurality of blocks or methods may be stored in a memory and implemented by software or firmware executed by a suitable system for executing instructions. For example, if implemented with a hardware, they may be implemented by any of the following technologies or their combinations known in the art as in another implementation: discrete logic circuits with logic gate circuits configured to achieve logic functions on data signals, a special integrated circuit with appropriate combined logic gate circuits, a programmable gate array (PGA), a field programmable gate array (FPGA), etc.

Those skilled in the art may understand that all or part of blocks in the above method embodiments may be implemented by instructing relevant hardware by computer programs. The programs may be stored in a computer readable storage medium, and the programs may include one of blocks of the method embodiments or their combination when executed.

In addition, functional units in the embodiments of the disclosure may be integrated in one processing module, or each of the units may be physically existed alone, or two or more units may be integrated in one module. The integrated module may be achieved by a form of hardware, and also may be achieved by a form of a software functional module. The integrated module may be stored in a computer readable storage medium when it is implemented in a form of a software functional module and sold or used as an independent product.

The above storage medium may be a read-only memory, a magnetic disk or an optical disk. Even though embodiments of the disclosure have been illustrated and described above, it may be understood by those skilled in the art that various changes, modifications, substitutions and alterations may be made for the embodiments without departing from the principles and spirit of the disclosure, and the scope of the disclosure is defined by claims and their equivalents.

What is claimed is:

1. A method for selecting a recommended node in a behavior deviation model, comprising:
    determining a delegation node and a target node in a current communication scenario;
    determining a plurality of candidate paths with the delegation node as a start node and the target node as an end node based on a preset network topology;
    determining at least one candidate node passing through each of the candidate paths, and acquiring a first behavior deviation corresponding to the target node at each candidate node, wherein the first behavior deviation is a deviation degree of the candidate node between current interaction behaviors with the target node and normal interaction behaviors with the target node;
    reading a second behavior deviation of each candidate node from a central node in the network topology, wherein the second behavior deviation is a deviation degree of the candidate node between current interaction behaviors with other nodes and normal interaction behaviors with other nodes;
    calculating an average deviation value for the target node based on second behavior deviations and first behavior deviations of all the candidate nodes in each candidate path;
    determining a candidate path with a smallest average deviation value as a target candidate path; and
    in response to the average deviation value of the target candidate path being less than or equal to a preset warning value, determining the candidate node on the target candidate path as a recommended node;
    wherein the method further comprises:

in response to a behavior deviation corresponding to the target node being locally stored at the delegation node, acquiring recording time of the behavior deviation; and entering a recommended node selection mode in response to determining that time difference between a current time and the recording time is greater than a preset time threshold.

2. The method of claim 1, further comprising:

in response to the average deviation value being greater than the preset warning value, determining whether the average deviation value is greater than or equal to a preset maximum value, wherein the preset maximum value is greater than the warning value;

in response to the average deviation value being greater than the preset maximum value, feeding back a notification message to the delegation node, in which the notification message indicates a forbidden communication connection between the delegation node and the target node; and in response to the average deviation value being less than or equal to the preset maximum value, calculating a difference value between the average deviation value and the warning value, determining a reduced packet distribution rate corresponding to the difference value, and adjusting a preset packet distribution rate from the delegation node to the communication node based on the reduced packet distribution rate.

3. The method of claim 1, further comprising:

locally storing the first behavior deviation corresponding to the target node in each candidate node; and determining the first behavior deviation corresponding to the target node at each candidate node, by:

reading the first behavior deviation corresponding to the target node locally stored at each candidate node.

4. The method of claim 1, further comprising:

acquiring a fourth behavior deviation of a neighbor node adjacent to each candidate node, wherein the fourth behavior deviation is a behavior deviation of the neighbor node between current interaction behaviors with the candidate node and normal interaction behaviors with the candidate node; and acquiring the second behavior deviation of each candidate node by calculating the fourth behavior deviation based on a preset formula, and storing the second behavior deviation in a deviation table of the central node.

5. The method of claim 4, wherein the preset formula is expressed by:

$$d_{g-node} = \sum_{i}^{neighbour} \frac{d_{i \to node}}{neighbour}$$

where $d_{g-node}$ is a second behavior deviation of a candidate node $^{node}$, $d_{i \to node}$ is a fourth behavior deviation of a neighbor node to the candidate node $^{node}$, neighbour represents a number of neighbor nodes of the candidate node $^{node}$, neighbour being an integer.

6. The method of claim 1, wherein acquiring the first behavior deviation corresponding to the target node at each candidate node comprises:

calculating a time duration from a moment of entering the recommended node selection mode to a moment of each candidate node receiving a data packet of a recommendation request; and acquiring the first behavior deviation corresponding to the target node at each candidate node in response to the time duration being less than or equal to a preset threshold.

7. An electronic device, comprising:

a processor, and a memory configured to store computer instructions executable by the processor, wherein the processor is configured to:

determine a delegation node and a target node in a current communication scenario;

determine at least one candidate path with the delegation node as a start node and the target node as an end node based on a preset network topology;

determine a plurality of candidate node passing through each of the candidate paths, and acquire a first behavior deviation corresponding to the target node at each candidate node, wherein the first behavior deviation is a deviation degree of the candidate node between current interaction behaviors with the target node and normal interaction behaviors with the target node;

read a second behavior deviation of each candidate node from a central node in the network topology, wherein the second behavior deviation is a deviation degree of the candidate node between current interaction behaviors with other nodes and normal interaction behaviors with other nodes;

calculate an average deviation value for the target node based on second behavior deviations and first behavior deviations of all the candidate nodes in each candidate path;

determine a candidate path with a smallest average deviation value as a target candidate path; and in response to the average deviation value of the target candidate path being less than or equal to a preset warning value, determine the candidate node on the target candidate path as a recommended node;

wherein the processor is further configured to:

in response to a behavior deviation corresponding to the target node being locally stored at the delegation node, acquire recording time of the behavior deviation; and enter a recommended node selection mode in response to determining that time difference between a current time and the recording time is greater than a preset time threshold.

8. The device of claim 7, wherein the processor is further configured to:

in response to the average deviation value being greater than the preset warning value, determine whether the average deviation value is greater than or equal to a preset maximum value, wherein the preset maximum value is greater than the warning value;

in response to the average deviation value being greater than the preset maximum value, feed back a notification message to the delegation node, in which the notification message indicates a forbidden communication connection between the delegation node and the target node; and in response to the average deviation value being less than or equal to the preset maximum value, calculate a difference value between the average deviation value and the warning value, determining a reduced packet distribution rate corresponding to the difference value, and adjust a preset packet distribution rate from the delegation node to the communication node based on the reduced packet distribution rate.

9. The device of claim 7, wherein the processor is further configured to:
locally store the first behavior deviation corresponding to the target node in each candidate node; and
determine the first behavior deviation corresponding to the target node at each candidate node, by:
reading the first behavior deviation corresponding to the target node locally stored at each candidate node.

10. The device of claim 7, wherein the processor is further configured to:
acquire a fourth behavior deviation of a neighbor node adjacent to each candidate node, wherein the fourth behavior deviation is a behavior deviation of the neighbor node between current interaction behaviors with the candidate node and normal interaction behaviors with the candidate node; and
acquire the second behavior deviation of each candidate node by calculating the fourth behavior deviation based on a preset formula, and storing the second behavior deviation in a deviation table of the central node.

11. The device of claim 10, wherein the preset formula is expressed by:

$$d_{g\text{-}node} = \sum_{i}^{neighbour} \frac{d_{i \to node}}{\text{neighbour}}$$

where $d_{g\text{-}node}$ is a second behavior deviation of a candidate node $^{node}$, $d_{i \to node}$ is a fourth behavior deviation of a neighbor node to the candidate node $^{node}$, neighbour represents a number of neighbor nodes of the candidate node $^{node}$, neighbour being an integer.

12. The device of claim 7, wherein the processor is further configured to:
calculate a time duration from a moment of entering the recommended node selection mode to a moment of each candidate node receiving a data packet of a recommendation request; and
acquire the first behavior deviation corresponding to the target node at each candidate node in response to the time duration being less than or equal to a preset threshold.

13. A non-transitory computer readable storage medium having a computer program stored thereon, wherein when the computer program is executed by a processor, the processor is caused to implement a method for selecting a recommended node in a behavior deviation model, the method comprising:
determining a delegation node and a target node in a current communication scenario;
determining at least one candidate path with the delegation node as a start node and the target node as an end node based on a preset network topology;
determining a plurality of candidate node passing through each of the candidate paths, and acquire a first behavior deviation corresponding to the target node at each candidate node, wherein the first behavior deviation is a deviation degree of the candidate node between current interaction behaviors with the target node and normal interaction behaviors with the target node;
reading a second behavior deviation of each candidate node from a central node in the network topology, wherein the second behavior deviation is a deviation degree of the candidate node between current interaction behaviors with other nodes and normal interaction behaviors with other nodes;
calculating an average deviation value for the target node based on second behavior deviations and first behavior deviations of all the candidate nodes in each candidate path;
determining a candidate path with a smallest average deviation value as a target candidate path; and
in response to the average deviation value of the target candidate path being less than or equal to a preset warning value, determining the candidate node on the target candidate path as a recommended node;
wherein the processor is further caused to implement:
in response to a behavior deviation corresponding to the target node being locally stored at the delegation node, acquiring recording time of the behavior deviation; and
entering a recommended node selection mode in response to determining that time difference between a current time and the recording time is greater than a preset time threshold.

14. The storage medium of claim 13, wherein the processor is further caused to implement:
in response to the average deviation value being greater than the preset warning value, determining whether the average deviation value is greater than or equal to a preset maximum value, wherein the preset maximum value is greater than the warning value;
in response to the average deviation value being greater than the preset maximum value, feeding back a notification message to the delegation node, in which the notification message indicates a forbidden communication connection between the delegation node and the target node; and
in response to the average deviation value being less than or equal to the preset maximum value, calculating a difference value between the average deviation value and the warning value, determining a reduced packet distribution rate corresponding to the difference value, and adjusting a preset packet distribution rate from the delegation node to the communication node based on the reduced packet distribution rate.

15. The storage medium of claim 13, wherein the processor is further caused to implement:
locally storing the first behavior deviation corresponding to the target node in each candidate node; and
determining the first behavior deviation corresponding to the target node at each candidate node, by:
reading the first behavior deviation corresponding to the target node locally stored at each candidate node.

16. The storage medium of claim 13, wherein the processor is further caused to implement:
acquiring a fourth behavior deviation of a neighbor node adjacent to each candidate node, wherein the fourth behavior deviation is a behavior deviation of the neighbor node between current interaction behaviors with the candidate node and normal interaction behaviors with the candidate node; and
acquiring the second behavior deviation of each candidate node by calculating the fourth behavior deviation based on a preset formula, and storing the second behavior deviation in a deviation table of the central node.

17. The storage medium of claim 16, wherein the preset formula is expressed by:

$$d_{g\text{-}node} = \sum_{i}^{neighbour} \frac{d_{i \to node}}{neighbour}$$

where $d_{g\text{-}node}$ is a second behavior deviation of a candidate node $^{node}$, $d_{i \to node}$ is a fourth behavior deviation of a neighbor node to the candidate node $^{node}$, neighbour represents a number of neighbor nodes of the candidate node $^{node}$, neighbour being an integer.

* * * * *